July 21, 1942.  T. H. RYAN  2,290,210

TRANSMISSION MECHANISM

Filed Oct. 11, 1939  7 Sheets-Sheet 2

INVENTOR.
Thomas H. Ryan.
BY
Chas. E. Townsend.
ATTORNEY

July 21, 1942.     T. H. RYAN     2,290,210
TRANSMISSION MECHANISM
Filed Oct. 11, 1939     7 Sheets-Sheet 3

INVENTOR.
Thomas H. Ryan.
BY
Chas. E. Townsend
ATTORNEY.

July 21, 1942.  T. H. RYAN  2,290,210
TRANSMISSION MECHANISM
Filed Oct. 11, 1939   7 Sheets-Sheet 4

INVENTOR.
Thomas H. Ryan.
BY
Chas. E. Townsend.
ATTORNEY

July 21, 1942.   T. H. RYAN   2,290,210
TRANSMISSION MECHANISM
Filed Oct. 11, 1939   7 Sheets-Sheet 5

INVENTOR.
Thomas H. Ryan.
BY Chas. E. Townsend
ATTORNEY

July 21, 1942.  T. H. RYAN  2,290,210
TRANSMISSION MECHANISM
Filed Oct. 11, 1939  7 Sheets-Sheet 7

INVENTOR.
Thomas H. Ryan.
BY
Chas. E. Townsend.
ATTORNEY.

Patented July 21, 1942

2,290,210

UNITED STATES PATENT OFFICE 2,290,210

TRANSMISSION MECHANISM

Thomas H. Ryan, San Francisco, Calif.

Application October 11, 1939, Serial No. 298,939

11 Claims. (Cl. 74—260)

This invention relates to a power transmission mechanism, and especially to a variable speed or torque transmitting mechanism or both, which, when interposed between a driving and a driven shaft, may be operated either automatically or manually to increase or decrease speed and torque ratios between the shafts.

The object of the present invention is generally to improve and simplify the construction and operation of transmission mechanisms; to provide a transmission which may have many uses and applications, among them that of an automotive transmission, and when so used will provide smooth efficient acceleration from a low reduced drive to a direct drive; to provide a transmission capable of producing a positive low drive, a positive second or intermediate drive, and a high or direct drive, and in which it is also possible to transmit an infinite number of speed ratio between low and second, and similarly between second and high; to provide a transmission of the character described in which all the gears employed are in constant mesh at all times; to provide a transmission in which the infinite number of speed ratios between low and second, and between second and high, are obtained through planetary action of the gears; and further, to provide a transmission of this character which may be either manually or automatically controlled, or both.

The invention is shown by way of illustration in the accompanying drawings, in which.

Figure 1:
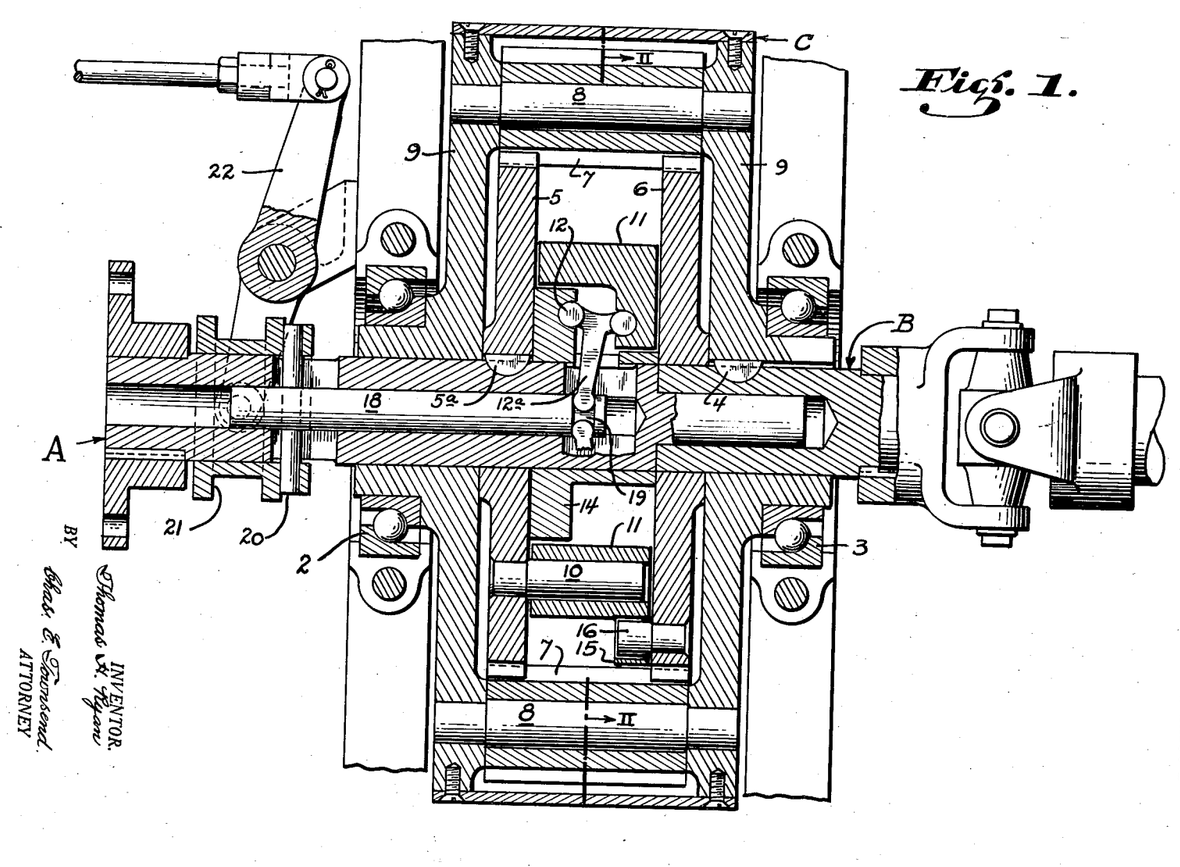
Fig. 1 is a central vertical longitudinal section showing the simplest form of the transmission.
Figure 2:
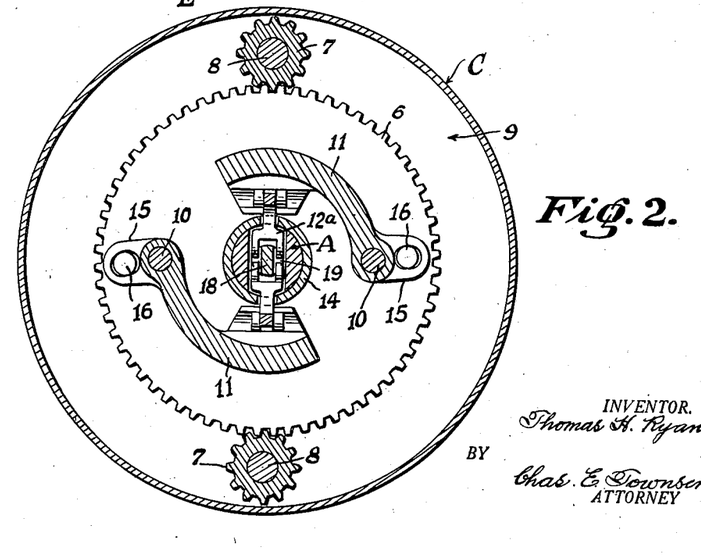
Fig. 2 is a cross section taken on line II—II of Fig. 1.

One form of gear transmission is shown in Figs. 1 and 2. This transmission is particularly intended for use where variation in speed between the driving and the driven shafts is desired. The transmission consists of a driving shaft A and a driven shaft B, suitably supported in bearings 2 and 3. Secured by a key 4 to the driven shaft is a drum C which is freely rotatable with relation to the driving shaft. Disposed within the drum is a pair of driving gears 5 and 6. The gear 5 will hereinafter be referred to as the "first driving gear" and the gear 6 as the "second driving gear."

Gear 5 is keyed or otherwise secured to the drive shaft, as indicated at 5a, while gear 6 is free, as a limited rotational movement will be transmitted thereto with relation to the gear 5, as will hereinafter be described. Both gears have the same pitch diameter and number of teeth, and both intermesh with the teeth of a pair of gears 7 which will hereinafter be referred to as the driven gears. The driven gears 7 are journaled on shafts 8 secured between the side walls 9—9 of the drum, and their function will hereinafter be described. Secured to the inner face of gear 5 is a pair of pins 10, and pivoted thereon are arms 11, the free ends of which are engaged by bell-cranks pivoted at 12 to a collar 14. Formed on the pivoted ends of the arms 11 are lugs 15, and extending into said lugs are pins 16 which are secured to the inner face of gear 6. The pins 10, arms 11, lugs 15 and pins 16 form a driving connection between the gears 5 and 6, and they also form a connection whereby relative rotational movement is imparted to the gears 5 and 6. Extending through the driving shaft A, which is tubular, is a pusher rod 18, the inner end of which has transverse grooves 19 formed therein to receive the ends of the bell-crank arms 12a. The opposite end of the pusher rod is connected through a pin 20 with a sliding collar 21, which in turn is operated through a lever 22 controlled by the operator. By means of lever 22, the operator imparts endwise movement to the pusher rod. This movement imparts rocking movement to the bell-cranks, and these in turn swing the arms 11 about their pivot pins 10, and, through lugs 15 and pins 16, rotate gear 6 relative to gear 5. This relative rotational movement is very slight, as it is limited to the play which may exist between the teeth of the intermeshing gears. By referring to Fig. 2 it will be noted that pins 16 are radially offset with relation to pins 10. This is important as the lugs 15 thereby form lever arms between the pins, which causes relative rotation between the gears 5 and 6 when arms 11 are swinging about their pivots.

The relative rotational movement is important, as by that movement equal or unequal pressures are applied by the teeth of gears 5 and 6 to the teeth of gears 7, in opposite directions. The range of pressures which may thus be exerted against the teeth of gear 7 by the teeth of gear 6 extends from zero to a value equal to that which may be exerted by the teeth of gear 5. At zero back pressure the device is in neutral, and no rotation is transmitted to driven shaft B, regardless of the speed at which driving shaft A turns. On the other hand, if the pressures exerted by the teeth of the gears 5 and 6 on the teeth of the gears 7 are equal and in opposite directions, then gears 7 will be locked against rotation about their own axis, and as such will revolve as an integral unit with the gears 5 and 6 about their axis. Between these limits, any pressure exerted by the rotation of gear 6 relative to gear 5 will oppose the rotation of gears 7 about their shafts 8 and cause planetary rotation about gears 5 and 6. This planetary movement of gears 7 will rotate the cage 9 and thus drive shaft B at a reduced speed which will be dependent on the relative opposing pressures exerted against gears 7 by gears 5 and 6. When the pressures are equal, a direct drive will be transmitted, and when the pressures are unequal, a reduced-speed drive will be transmitted. Inasmuch as the pressures applied are due to relative rotation of the gears, and this is under the control of the operator, any degree of unequal pressure may be applied; hence if the drive shaft has a fixed number of revolutions, for instance 100 R. P. M., it is possible to transmit any speed, from neutral to a direct drive, from the drive shaft to the driven shaft or that indicated at B.

In Figs. 3 to 11 inclusive, a gear transmission is disclosed which is particularly intended for automotive and like uses. The transmission embodies the same features as that disclosed in Fig. 1 and in addition thereto other features which make it possible to produce a positive low gear drive, a positive second or intermediate drive, and a positive high or direct drive. It is also possible to transmit an infinite number of speed ratio between low and second and to transmit an infinite number of speed ratio between second and high. All the gears employed are in constant mesh with each other at all times, and the infinite number of speed ratios between low and second, and between second and high, are obtained through planetary action of the gears.

Figures 3, 4:
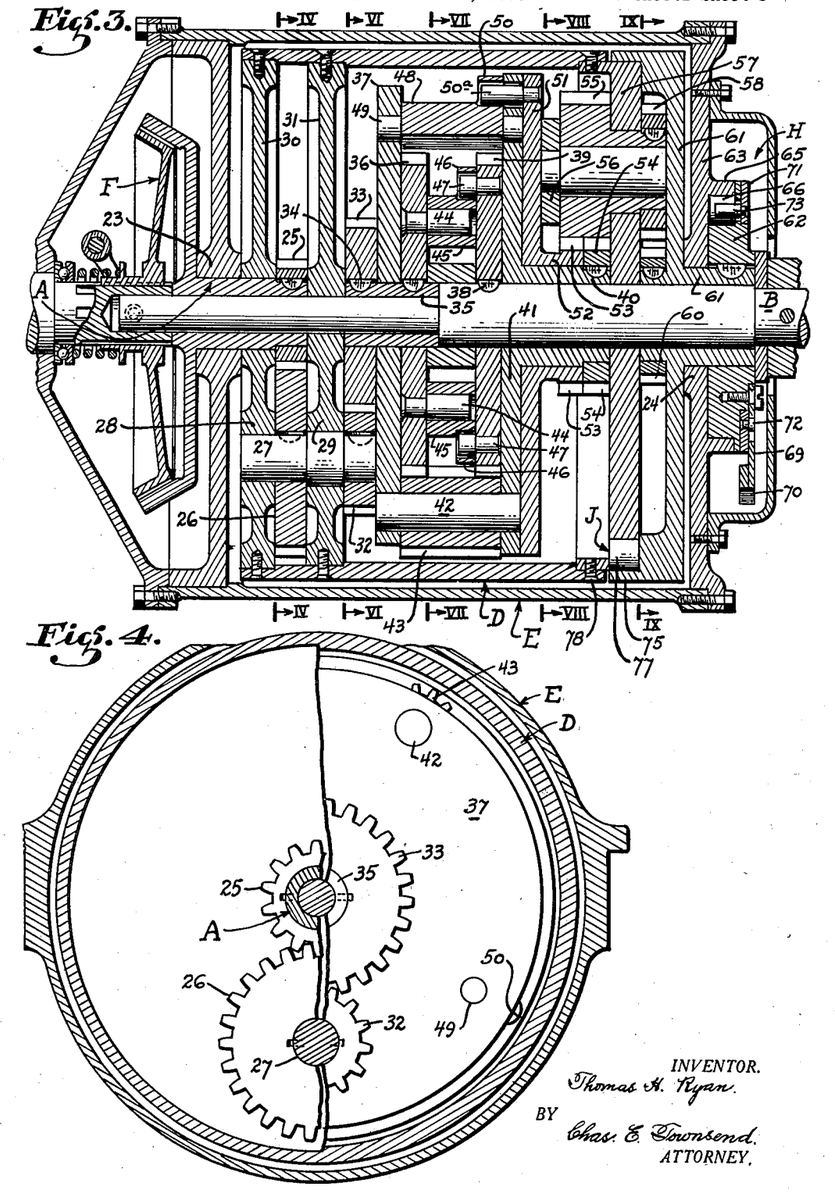
Fig. 3 is a central vertical longitudinal section showing a transmission suitable for automotive and like purposes.
Fig. 4 is a cross section on line IV—IV of Fig. 3.
Figure 5:
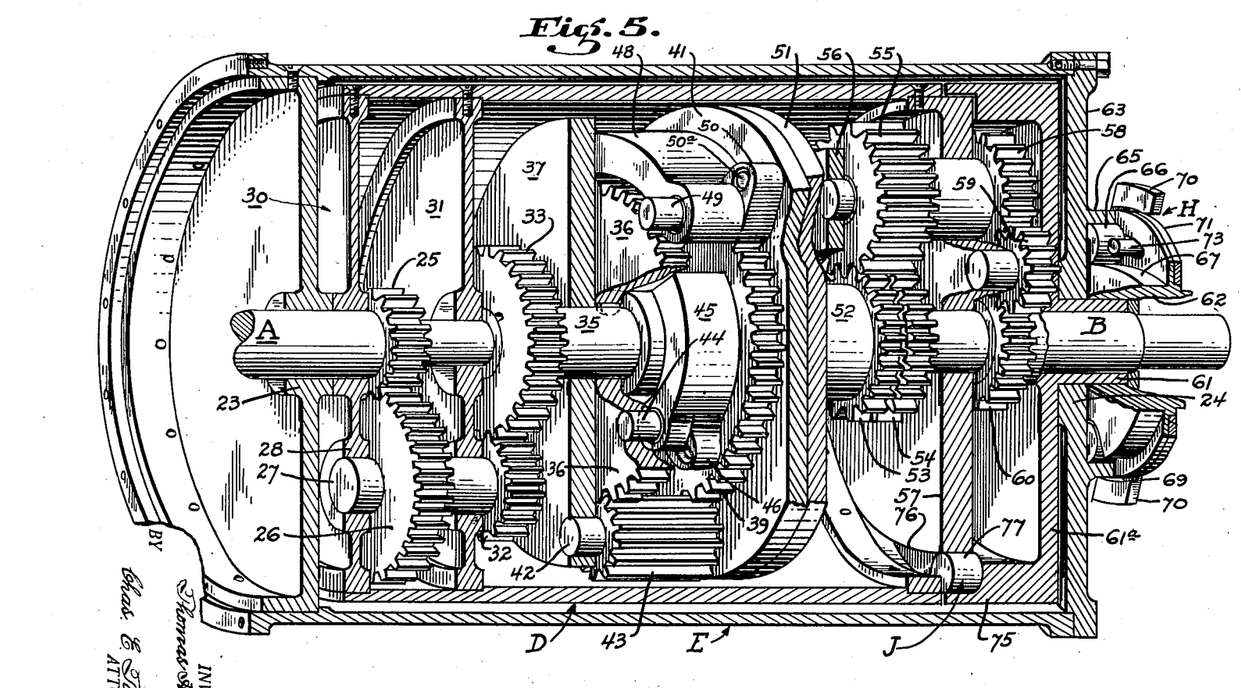
Fig. 5 is a perspective view, partially in section and partially broken away, of the transmission shown in Fig. 3.
Figure 6:
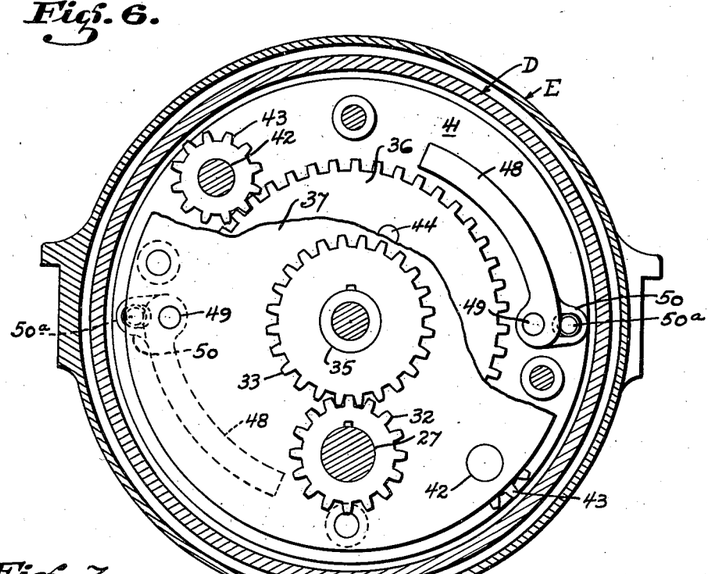
Fig. 6 is a cross section taken on line VI—VI of Fig. 3.
Figure 7:
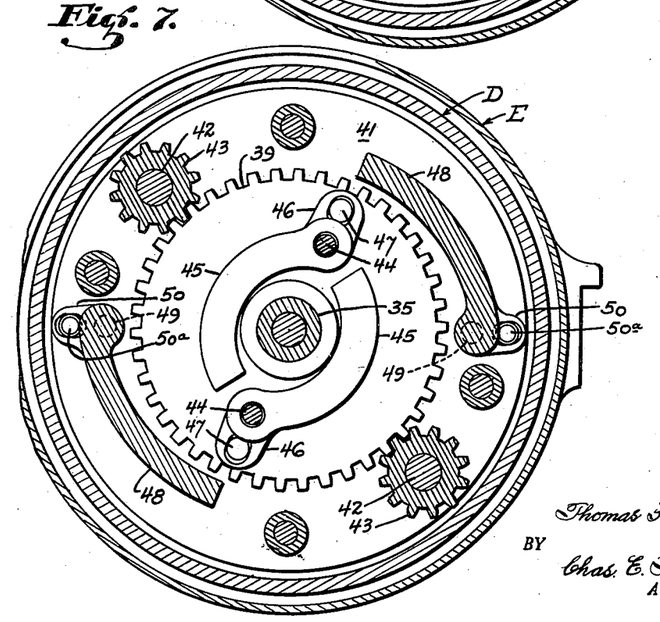
Fig. 7 is a cross section taken on line VII—VII of Fig. 3.
Figure 8:
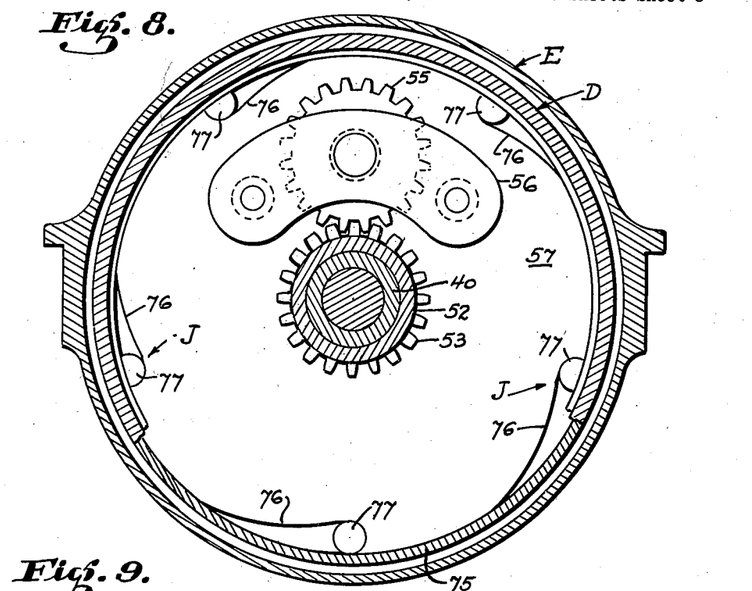
Fig. 8 is a cross section taken on line VIII—VIII of Fig. 3.
Figure 9:
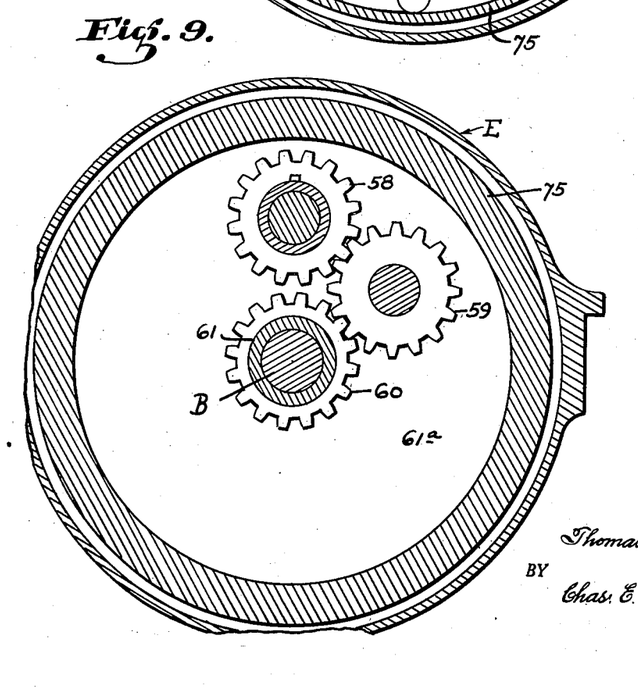
Fig. 9 is a cross section taken on line IX—IX of Fig. 3.
Figure 10:
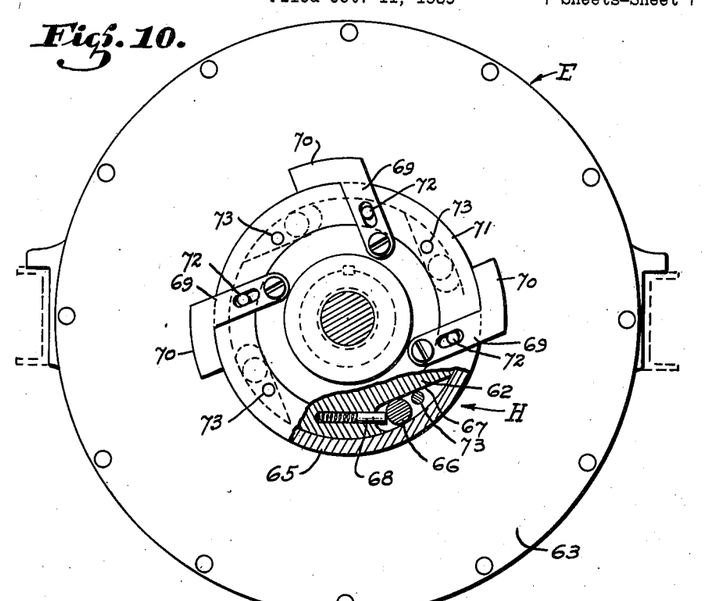
Fig. 10 is an end view of the transmission shown in Fig. 3, showing the cover plate removed, said figure being also partially in section.
Figure 11:
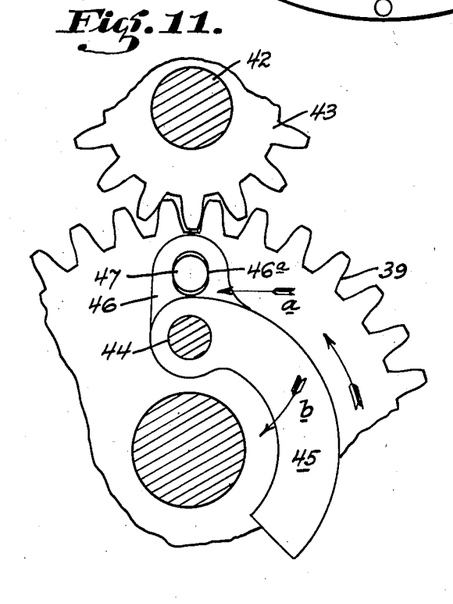
Fig. 11 is a diagrammatic view showing the manner in which the driving gears are relatively rotated with relation to each other.

The transmission consists of a drum or housing D, through which extend two shafts, a drive shaft A and a driven shaft B. These shafts are journaled at their outer ends in bearings 23 and 24 formed in an exterior housing E which may be termed the gear case housing. The drive shaft A may be driven in the usual manner through means of a clutch F. Keyed or otherwise secured on the drive shaft is a spur gear 25, and intermeshing therewith is an intermediate gear 26 secured on a shaft 27. This shaft is journaled as at 28 and 29 in plates 30 and 31 secured within the drum, and they are stationary when the drum is stationary and rotate when the drum is rotated, as will hereinafter be described. Also secured on the shaft 27 is a gear 32, and this intermeshes with a gear 33 which is keyed or otherwise secured, as shown at 34, to an intermediate tubular shaft 35 which is freely rotatable with relation to the driven shaft. Keyed or otherwise secured to the opposite end of the intermediate shaft 35 is a gear 36, and supported on the shaft between the gears 33 and 36 is a disc 37. Keyed to the driven shaft B as at 38 is a gear 39, which is identical to the gear 36 as it has the same pitch diameter and number of teeth as the gear 36. These gears will later be referred to as driving gears.

Freely rotatable with relation to the driven shaft is a sleeve 40, and formed as part thereof, or secured thereto, is a disc 41. Secured between the discs 37 and 41 are a pair of shafts 42, and journaled on each shaft is a gear 43. The gears 43 are in constant mesh with the teeth of the gears 36 and 39, and will be referred to as the driven gears. The gears 43, together with the discs 41 and 37 between which they are journaled, are capable of planetary motion about the gears 36 and 39, and they are also adapted to be locked therewith, under certain conditions which will hereinafter be described.

To describe the manner in which low gear drive is transmitted through the gear transmission, it may be said that when the clutch F is engaged, power is transmitted through the shaft A, thereby transmitting a reduced drive through the gears 25, 26, 32 and 33 to the intermediate shaft 35, and to the gear 36 secured thereto. The reduction obtained through the gears 25, 26, 32 and 33 will, for purposes of description, be considered as 3:1; hence when shaft A makes three revolutions, gears 33 and 36 will make one revolution. The gears 36 and 39 are at all times driven in unison through mechanism hereinafter to be described, as they are tied together; and as gear 39 is keyed as at 38 to the driven shaft, the driven shaft, or that indicated at B, will rotate one revolution when the shaft A is rotated three. The manner in which the gears 36 and 39 are tied together will now be described.

Projecting from the inner face of the gear 36 are two pins 44, and pivotally mounted on each pin is a centrifugally actuated weight arm 45. On each weight arm is a lug 46. A pair of pins 47 on the gear 39 project into the lugs 46. These pins are offset radially with relation to the pins 44 for purposes hereinafter to be described. They form, together with the pins 44, the weights 45 and the lugs 46, a direct driving connection between the gears 36 and 39, as the pins 44 carry the weight arms 45, and these are in turn connected with the gear 36 through the lugs 46 and the pins 44. Thus, when a low gear drive is being transmitted from the gear 36 to the gear 39, and from that gear to the driven shaft B, the drive is transmitted through the pins 44, the weight arms 45, the lugs 46 and the pins 47. This connection permits a slight relative movement between the gears 36 and 39, that movement being limited by the play between the teeth of the gears 36 and 39 and the gears 43 intermeshing therewith. This relative movement is depended upon to transmit planetary motion to the gears 43 about the gears 36 and 39, and it is also depended upon to lock the gears 43 with relation to the gears 36 and 39 when the second or intermediate drive is to be transmitted.

This drive is transmitted when transmission through the low drive, just described, has imparted sufficient momentum to the vehicle in which the gear transmission is mounted to lighten the load on the driven shaft B sufficiently to permit the entire gear transmission to pick up in speed, and when a certain speed is reached centrifugal action will tend to swing the weight arms 45 outwardly. In other words, centrifugal action will cause the weighted arms to rotate slightly about their pivots 44. In so doing, the gears 36 and 39 are rotated a slight distance relative to each other, and when that happens there will be a pressure exerted on the teeth of the gears 43 in opposite directions, causing them to planetate about gears 36 and 39 until finally the gears 43 will lock with relation to the gears 36 and 39, and they will revolve as a unit about the driven shaft. This revolving movement is added to the motion already transmitted through the gear 33, and a stepped-up speed is thus obtained which brings the transmission into the second or intermediate drive.

However, before second or intermediate drive is reached, there is an infinite speed ratio between low and second, as the gears 43 do not lock with relation to the gears 36 and 39 until equal and opposite pressures are applied to the gear teeth, and this does not occur until the transmission as a whole reaches a certain speed. That is, gears 43 will planetate slower and slower as centrifugal action increases in the weighted arms 45, and they will finally stop planetation when equal and opposite pressures are obtained between the teeth of the gears 43 and the intermeshing gears 36 and 39. When this condition is reached, discs 37 and 41 will rotate in unison with the gears 36 and 39, and will step the gear ratio from 3:1 to 2:1, the gear ratio of course being optional but being merely stated as 2:1 in this instance for the purpose of describing the operation of the transmission. That is, let it be assumed that the low gear ratio is 3:1; that the secondary or intermediate ratio is 2:1, and that the final or high gear is a direct drive. Inasmuch as gears 36 and 39 serve the function of driving the gears 43, gears 36 and 39 are referred to as driving gears, and the gears 43 as driven gears.

The added revolutions obtained when the secondary portion of the drive operates is accomplished as follows: A second pair of centrifugally actuated weights are shown at 48. These are pivotally mounted on pins 49 secured between the discs 37 and 41. These weights are also provided with lugs 50 and a pair of pins 50a secured on a disc 51 extend through the plate 41 into the lugs. The disc 51 is secured on a sleeve 52 which carries a pinion gear 53. Sleeve 49 also carries an identical pinion gear 54, and the pinion gears 53 and 54 intermesh with a gear 55 journaled between plates 56 and 57, the plate 57 being secured to the drum C so as to rotate therewith. Secured to rotate with the gear 55 is a second gear 58. This intermeshes, through means of an intermediate gear 59, with a gear 60 which is keyed to a sleeve 61, this sleeve being in turn keyed to the inner member 62 of a roller-actuated one-way brake supported by the end of the gear case housing, indicated at 63. This brake normally secures the sleeve 61 and the gear 60 against counterclockwise rotation. Hence when the gears 43 lock with the gears 36 and 39 and rotate in unison therewith, discs 37 and 41 will also rotate in unison therewith, and so will the disc 51, as this is driven through means of the pins 50a and the centrifugally actuated weight arms 48. Disc 41 carries the gear 54, and disc 51 the gear 53. These will accordingly be rotated in unison, and will drive the gear 55. This in turn drives the gear 58, and this gear, together with the intermediate gear 59, will thus planetate about the stationary gear 60. In other words, there is a positive planetary drive about the gear 60 when the second or intermediate state is reached, and it is the added revolutions produced by this planetary drive which increases the speed ratio from 3:1 to 2:1.

There are two overrunning one-way brakes in the transmission, and they are generally indicated at H and J. Both brakes are required to take up gear reaction when transmitting through the low gear drive. In second or intermediate drive, brake H takes up the gear reaction, while brake J will be overrunning, and, as such, is inactive. In high or direct drive, both brakes will overrun and are both inactive.

The brake H is constructed as follows: The end of the gear case or housing E is provided with an outwardly projecting annular flange 65. Between this flange and the rotatable member 62 of the brake are a series of rollers 66. The member 62 is provided with the usual cam faces 67, and spring actuated plungers 68 which engage the rollers 66 so as to maintain the rollers in contact with the cam faces and the inner face of the flange 65, so that they may act instantaneously to prevent counterclockwise rotation, as will hereinafter appear. A plurality of arms 69 are pivoted at their inner ends to the outer face of the rotatable member 62. The outer ends of the arms are provided with weights 70 which are centrifugally actuated when member 62 rotates. A ring 71 is also mounted on the outer face of the member 62, and it is partially rotatable with relation thereto. The ring is connected to the centrifugally actuated weights and arms 69 by pins 72, so that when the arms assume a radial position, due to centrifugal action, motion is imparted to partially rotate the ring. Such rotational movement is utilized to hold the rollers 66 out of contact with the cam faces and the annular flange 65, so as to retain them in an inoperative position when the member 62 is rotating. This is accomplished by securing pins 73 to the inner face of the ring, and placing them in position to engage the rollers 66, thereby forcing them out of engagement with the cooperating faces of the respective brake member.

When the transmission is in second or intermediate drive, gears 55, 58 and 59 as previously stated will planetate about gear 60. In doing so, they tend to rotate gear 60 counterclockwise. This obviously can not take place, as gear 60 is keyed to a sleeve 61, and this is in turn keyed to the member 62 of the brake H; and as this is the case, if there is a tendency for gear 60 and sleeve 61 to rotate counterclockwise, it will immediately be checked, as member 62 can not rotate counterclockwise within its brake, since rollers 66 cooperating therewith will immediately engage and brake. It is for this reason that gears 55, 58 and 59 all planetate about gear 62 when the transmission is driven through intermediate or second speed.

The one-way brake J consists of a disc 61a formed integral with sleeve 61. The outer edge of the disc is provided with an annular flange 75. Disc 57 has a series of cam faces 76 formed on its outer surface, and rollers 77 are interposed between these cam faces and the annular flange 75. In intermediate or second speed, disc 61a will be stationary, as it forms an integral part of sleeve 61. Disc 57, on the other hand, will rotate, as it carries gears 56 and 58 which are planetating about gear 60, and as disc 57 is secured to the drum C, as indicated at 78, discs 30 and 31 at the opposite end of the drum will also rotate, since they are secured to the drum, and the reduction gears 26 and 29 will planetate about gears 25 and 33, while power is being transmitted through them from shaft A. In other words, brake J is overrunning, and is not functioning, in second or intermediate speed. In fact, the only time it does function is in low gear, as previously described.

A 1:1 drive between the shafts B and C, or in other words a direct drive between the shafts, is obtained in substantially the same manner as intermediate or second speed drive. It is accomplished as follows: When intermediate or second speed is being transmitted, and the vehicle gains sufficient momentum, the speed tends to increase, and the load on the driven shaft to decrease. As the speed of the discs 37 and 41 increases due to these factors, the centrifugally actuated weights 48 tend to swing outwardly about their pivots 49. In so doing, the lugs 50 exert pressure on the pins 50a carried by the disc 51, and again there is a tendency for the disc 51 to partially rotate with relation to the disc 41. This rotational movement is of course infinitesimal, as it is limited to the play that may exist between the intermeshing gears, the gears referred to being gears 53 and 54, which intermesh with the gear 55. The centrifugal force exerted finally reaches a point where equal and opposite pressures are applied by the gears 53 and 54 to the teeth of the gear 55, and when this stage is reached, gear 55 becomes locked with relation to the gears 53 and 54, and when gear 55 becomes locked, so do gears 58, 59 and 60; in fact, all the gears throughout the entire transmission become locked, and when they do so, a direct drive is formed between the shafts A and B.

Between second drive and direct drive there is again an infinite gear ratio, as direct and opposite forces are not applied by the gears 53 and 54 to the gear 55 until a certain centrifugal force is exerted on the weights 48. Unequal pressures are therefore applied by the gears 53 and 54 upon the gear 55, which tends to carry the gear 55 around with the gears 53 and 54. In second or intermediate drive, gear 55 planetates with a certain speed about the gears 53 and 54, but as opposite pressures are exerted by the gears 53 and 54, upon the teeth of the gear 55, these pressures tend to carry the gear 55 around with the gears 53 and 54; hence the planetating motion gradually slows down until equal and opposite pressures are applied, when all the gears in the entire transmission become locked and rotate as one solid unit. It is during the stage between intermediate and direct drive that these forces are gradually applied which slow down the planetary motion of the gear 55, and it is for this reason that an infinite gear ratio exists between intermediate and direct drive. The moment the gear 55 commences to be carried around with the gears 53 and 54, gear 60 will travel with gear 55 at exactly the same speed, and the inner member 62 of brake H will thus commence to overrun, and when a direct drive is obtained full overrunning speed will be reached. At that time the centrifugal action on the weighted arms 69 will reach a point where the ring will rotate and hold the rollers 66 out of engagement with the cam faces, and a free-running, substantially frictionless brake results. Clutch J of course was already overrunning in intermediate drive, and in direct drive is overrunning at the same speed as brake H.

The centrifugally actuated weights 45 and 48 operate in successive order. When the low drive is being transmitted, and after the vehicle has gained sufficient momentum to permit speed to increase and the load on the shaft B to be decreased, the centrifugal weights 45 operate and impart relative movement through the gears 36 and 39 to apply equal and opposite pressures to the gears 43, and when equal and opposite pressure is obtained, the transmission reaches intermediate or second speed drive. One might ask, "Why do not the centrifugally actuated weights 48 also act, and thereby tend to form the direct drive between the shafts A and B?" This can not take place, as rotational movement is not transmitted to the discs 37 and 41, between which the weights 48 are mounted, until the second or intermediate speed drive is taking place; hence the weights 48 and the discs 37 and 41 are standing stationary during low gear drive, and while they commence slow rotation, they will not reach their full speed of rotation until the second gear drive has been attained. Even then, the weights 48 will not function, as when second or intermediate speed is reached, speeding up must take place before they begin to function, and a fairly high speed must be reached before they fully function to apply equal and opposite pressure through means of gears 53 and 54 on the teeth of the gear 55; it is only then that direct drive is obtained.

The centrifugally actuated weights 45 and 48 function in pairs, and their action is identical; hence the description of one of the pairs of weights employed should suffice. By referring to Figs. 5 and 11, and particularly to the weights 45, it will be noted that these weights are pivoted on the pins 44 which are secured to the gear 36, and that through the lugs 46 and the offset pins 47 which are secured to the gear 39, a direct driving connection is formed between the gears. This drive operates as follows: When gear 36 is driven it will carry the pins 44, and the weights 45 pivoted thereon, around with it, and as the pins 39 extend into the lugs 46 the side wall of the lugs, indicated at 46a, will push against the pins 47 and thereby drive or push the gear 39 around with the gear 36. The force exerted by the lugs 46 against the pins 47 is in the direction of arrow $a$ (see Fig. 11). As the rotation of gear 36, which carries the pins 44, is in the same direction, and as the pins 47 are radially offset with relation to the pins 44, a lever arm is formed which tends to swing the free ends of the weights inwardly in the direction of arrows $b$. The weights will assume their innermost position in low gear drive, and will remain in that position until the load on shaft B is lessened and the R. P. M. of said shaft reaches a predetermined speed. As the predetermined speed is approached, centrifugal force is set up in the weights 45, and they begin to swing outwardly, and as such, counteract the force exerted between the lugs 46 and the pins 47. When a predetermined speed is reached, the centrifugal force will be greater than the load force; that is, as the centrifugal force begins to equal the load force the weights tend to swing about their pivots, or the pins 44, in a direction opposite to the arrows b in Fig. 11, thus tending, through lugs 46 and pins 47, to force the gear 39 ahead of the gear 36, or in other words, to bring about relative rotation between the gears 36 and 39. In actual practice there is very little if any relative movement, as such movement is limited to the amount of play or lost motion between the teeth of the gears 36 and 39 with relation to the teeth of the gears 43 with which they intermesh. However, slight as this movement may be, it is sufficient to permit opposite pressures to be applied to the teeth of the gears 43, and when the pressures are equal and in opposite directions, these gears will lock with relation to the teeth of the gears 36 and 39, and they will rotate around and around with the gears 36 and 39, as if they formed an integral part thereof. When they do lock, intermediate or second speed is reached. The force applied by the centrifugally actuated weights is gradually increased as the speed increases, and when the force is small, gears 43 will commence to planetate slowly about the gears 36 and 39 and in the same direction as the gears 36 and 39 are rotating. The speed of planetation increases as the centrifugal force increases, and the greatest speed is reached when the gears become locked, as gears 22 will then rotate about the shaft B at the same speed as gears 36 and 39. It is this gradual application of centrifugal force which permits an infinite gear ratio between low and second, and similarly between second speed and direct or high, as the weights 48 function in the same manner as the weights 45.

Figure 12:
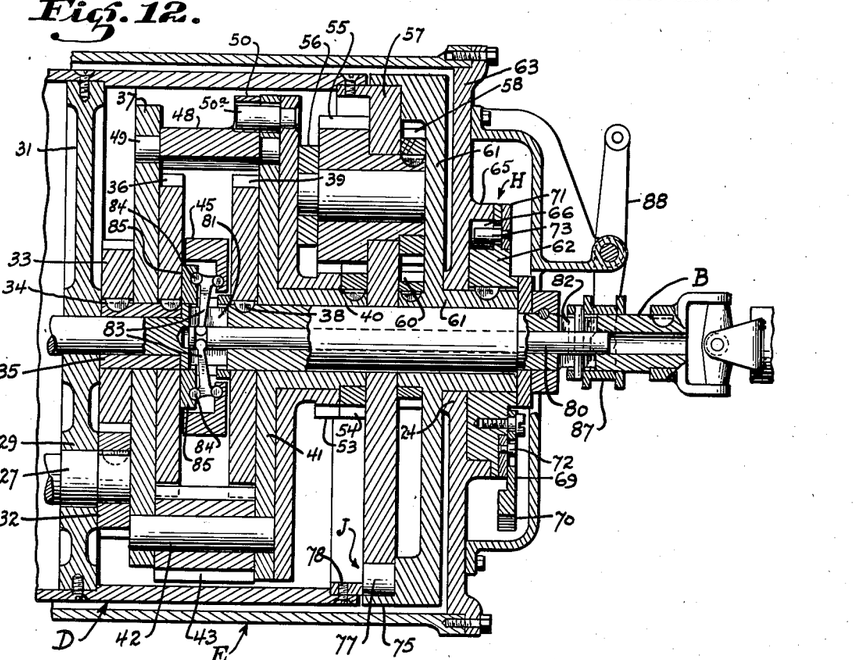
Fig. 12 is a section similar to Fig. 3 showing one end of the transmission, said view also showing an attachment whereby the transmission may be manually controlled.

The drive through the lowest gear ratio, then through intermediate, and finally through high or direct drive is, as previously described, entirely automatic in action, as it is controlled by the centrifugally actuated pivot arms or weights 45 and 48. The transmission may, however, be manually controlled in the same manner as that disclosed in Figs. 1 and 2, and this is desirable under certain conditions, for instance, when the transmission is employed in an automobile or like vehicle, and particularly when traveling down grade where it is desirable to utilize the compression of the engine for braking purposes. A manual control is shown in Fig. 12, and is constructed and operated as follows:

The driven shaft or that indicated at B is in this instance made tubular to permit a pusher rod 80 to be placed therein. Two transverse slots 81 and 82 are also formed in the shaft. Extending into the slot 81 are the arms 83 of a pair of bell cranks which are pivoted as at 84 in a collar 85. The other ends of the bell cranks engage the outer or free ends of the centrifugally actuated weights 45. The inner end of the pusher rod is grooved to receive the inner ends 83 of the bell cranks so that by imparting endwise movement to the pusher rod, the bell cranks may be rocked in either direction; that is, to pull the weights inwardly or to push them in an outward direction, as occasion may demand. The opposite end of the pusher rod extends into the transverse slot 82 and is connected with a sliding collar 87 actuated by a lever arm 88 which is under the control of the driver.

To explain the operation of the manual control, let it be assumed that an automobile employing this type of transmission is traveling in high or direct drive, and that a down grade is encountered. Also let it be assumed that the grade is so steep that second or low gear must be entered so as to speed up the engine sufficiently to provide the desired degree of braking action. To accomplish this, the driver merely imparts inward movement to the pusher rod 80. At this time, the weights 45 are held in their outer position by centrifugal action, but when the pusher rod is forced inwardly by manual operation, the bell cranks will be swung about their pivots in a direction which will pull the free ends of the weights inwardly against the centrifugal force. As the weights are being pulled inwardly, the opposing forces exerted by the teeth of the gears 36 and 39 on the teeth of the gears 43 will gradually reduce, thereby gradually releasing the driving force between these gears and permitting gears 43 to start planetating about the gears 36 and 39. When this happens, the rotational speed of the discs 37 and 41 becomes lower and lower and the centrifugal action on the weights 48 becomes so reduced that the opposing forces applied to the gears 53 and 54 are also gradually reduced and finally nullified. When these forces are nullified, the transmission is in intermediate gear; and when the opposing forces in the gears 36 and 39 are nullified, the transmission is in low gear. Thus the operator can manually control the transmission and retain it in any gear ratio desired whether traveling on an up grade or a down grade.

Having thus described and illustrated my invention, what I claim and desire to secure by Letters Patent is:

1. In a transmission of the character described a drive and a driven shaft, a low and an intermediate gear reduction through which power may be transmitted from the drive to the driven shaft, including means operable by centrifugal force for producing a first infinite speed ratio drive between low and intermediate and a second infinite speed ratio drive between intermediate and the direct drive, means depending upon the load imposed on the driven shaft for automatically transmitting power from the drive to the driven shaft either through low, or the first named infinite speed ratio drive and intermediate, and other means depending upon the load imposed on the driven shaft for automatically transmitting power from the drive to the driven shaft through low, the first infinite speed ratio drive, the intermediate, and the second infinite speed ratio drive, said last named means also adapted to lock all the drives with relation to each other and the drive and driven shaft, to permit a direct drive from the drive to the driven shaft.

2. In a transmission of the character described a drive and a driven shaft, a low and an intermediate gear reduction through which power may be transmitted from the drive to the driven shaft, means operable by centrifugal force to produce a first infinite speed ratio drive between low and intermediate, a second infinite speed ratio drive between intermediate and the direct drive, manually controlled means for transmitting power from the drive to the driven shaft either through low, the first named infinite speed ratio drive and the intermediate, and means depending upon the load imposed on the driven shaft for automatically transmitting power through the second infinite speed ratio drive and the intermediate gear drive, said last named means also adapted to lock the intermediate gear drive to permit a direct drive to be formed between the drive and the driven shaft.

3. In a transmission of the character described a pair of driving gears mounted for slight relative rotation, a driven gear meshing with both of said gears and mounted to rotate about its own axis and to revolve about the common axis of the driving gears, and manually controlled means for gradually bringing about relative rotation between the driving gears to cause the teeth of said gears to gradually apply pressure to the teeth of the driven gear in opposite directions, to cause the driven gear first to planetate about the driving gears and finally to lock and revolve with said gears as a unit about their common axis.

4. In a transmission of the character described a first and a second driving gear, a driven gear intermeshing with both of said gears, a mounting for the driven gear permitting rotation thereof about its own axis and also rotation about the axis of the driving gears, a driving connection between the first and the second driving gears, said connection permitting relative rotational movement between the first and the second driving gear to cause the teeth of said gears to apply sufficient pressure to the teeth of the driven gear, in opposite directions, to lock the driven gear against rotational movement about its own axis, and manual means for gradually imparting relative rotational movement to the first and second driving gears to gradually apply opposing pressures to the teeth of the driven gear, to cause the driven gear first to planetate about the driving gears and finally to revolve with said gears without rotating about its own axis.

5. In a transmission of the character described a pair of driving gears mounted for slight relative rotation, a driven gear meshing with both of said gears and mounted to rotate about its own axis and to revolve about the common axis of the driving gears, said driving gears being spaced apart, a pin secured to the face of one gear, a weighted arm having one end pivoted on said pin and the opposite end free to swing outwardly when acted upon by centrifugal force, a lug adjacent the pivoted end of the weight, a pin on the other driving gear projecting into said lug, said weighted arm when acted upon by centrifugal force swinging about its pivot in a direction to cause the lug to apply sufficient pressure on the pin on the second driving gear, which it engages, to cause relative rotational movement between the driving gears, said relative movement being gradually imparted and being proportional to the action of the centrifugal force applied to the pivotally mounted, centrifugally actuated weight, said gradual relative movement causing the driven gear first to planetate about the driving gears and, when the force applied has become great enough, causing the driven gear to revolve with the driving gears about their axis.

6. In a transmission of the character described, a drive shaft, an intermediate shaft and a driven shaft, a reduction gear drive interposed between the drive and intermediate shaft, a pair of driving gears driven by the intermediate shaft, a driven gear meshing with both of the driving gears, a mounting for said driven gear permitting planetary movement of the driven gear about the driving gears, and also permitting rotation of the driven gear in unison with the driving gears about the axis of the intermediate shaft, said driving gears having a slight relative rotational movement with relation to each other, and means for gradually bringing about relative rotation between the driving gears to cause the teeth of said gears to gradually apply pressure to the teeth of the driven gear in opposite directions, to cause the driven gear first to planetate about the driving gears and finally to lock and revolve with said gears as a unit about their common axis.

7. In a transmission of the character described a drive shaft, an intermediate shaft, and a driven shaft, a reduction gear drive interposed between the drive and intermediate shafts, a first driving gear secured to the intermediate shaft, a second driving gear secured to the driven shaft, said gears having the same pitch diameter and number of teeth, a driven gear meshing with the driving gears, a pair of discs freely rotatable about the intermediate and the driven shaft, an axle on which the driven gear is journaled secured between said discs, a driving connection formed between the first and the second driving gear, said driving connection permitting a limited relative movement between said gears to cause the teeth of said gears to apply pressure to the teeth of the driven gear in opposite directions, and means for gradually imparting relative rotation to the driving gears to gradually apply opposing pressures to the teeth of the driven gear to cause it, together with the pair of discs between which it is journaled, first to planetate about the driving gears and finally to revolve with said gears without rotation about its own axis.

8. In a transmission of the character described a drive shaft, an intermediate shaft, and a driven shaft, a reduction gear drive interposed between the drive and intermediate shafts, a first driving gear secured to the intermediate shaft, a second driving gear secured to the driven shaft, said gears having the same pitch diameter and number of teeth, a driven gear meshing with the driving gears, a pair of discs freely rotatable about the intermediate and the driven shaft, an axle on which the driven gears is journaled secured between said discs, a driving connection formed between the first and the second driving gear, said driving connection permitting a limited relative movement between said gears to cause the teeth of said gears to apply pressure to the teeth of the driven gear in opposite directions, means for gradually imparting relative rotation to the driving gears to gradually apply opposing pressures to the teeth of the driven gear to cause it, together with the pair of discs between which it is journaled, first to planetate about the driving gears and finally to revolve with said gears without rotation about its own axis, a hub formed on one of the first named discs, a third disc journaled on said hub, means carried by the first and second named discs for imparting a slight relative rotational movement between the second and third discs, a pair of gears of the same pitch diameter and number of teeth one secured to the second disc and one to the third disc, and relatively rotatable with relation to each other when the discs are relatively rotated, and a second driven gear intermeshing with said gears, said gear adapted to planetate about the second named driving gears and also adapted to rotate in unison with the same about their axis, said second named driving gears, and the gear driven thereby, forming a direct driven connection between the drive shaft, the intermediate and the driven shaft when sufficient pressure is applied in opposite directions by the second named driving gears to the second named driven gear to lock this against rotation about its own axis.

9. In a transmission of the character described a drive shaft, an intermediate shaft, and a driven shaft, a reduction gear drive interposed between the drive and intermediate shafts, a first driving gear secured to the intermediate shaft, a second driving gear secured to the driven shaft, said gears having the same pitch diameter and number of teeth, a driven gear meshing with the driving gears, a pair of discs freely rotatable about the intermediate and the driven shaft, an axle on which the driven gear is journaled secured between said discs, a driving connection formed between the first and the second driving gear, said driving connection permitting a limited relative movement between said gears to cause the teeth of said gears to apply pressure to the teeth of the driven gear in opposite directions, means for gradually imparting relative rotation to the driving gears to gradually apply opposing pressures to the teeth of the driven gear to cause it, together with the pair of discs between which it is journaled, first to planetate about the driving gears and finally to revolve with said gears without rotation about its own axis, a hub formed on one of the first named discs, a third disc journaled on said hub, means carried by the first and second named discs for imparting a slight relative rotational movement between the second and third discs, a pair of gears of the same pitch diameter and number of teeth one secured to the second disc and one to the third disc, and relatively rotatable with relation to each other when the discs are relatively rotated, a second driven gear intermeshing with said gears, said gear adapted to planetate about the second named driving gears and also adapted to rotate in unison with the same about their axis, a disc in which said second named driven gear is journaled, a one-way brake securing said disc against rotation except when the driven gear planetates or rotates with the second named driving gears about their axis, a second one-way brake, a gear connected therewith and held against rotation in one direction, a gear driven by the second named driven gear, and an intermediate gear intermeshing with said gear and the gear which is connected with the last named one-way brake.

10. In a transmission of the character described a stationary housing, a drive and a driven shaft mounted in said housing, a drum journaled within the housing through which the shafts extend, a low and an intermediate gear transmission train mounted within the drum, through which power may be transmitted from the drive to the driven shaft, means operable at predetermined speeds to utilize centrifugal force to effect a first infinite speed ratio drive between the low and the intermediate gear train, means operable at predetermined speeds to utilize centrifugal force to effect a second infinite speed ratio drive between the intermediate gear train and a direct drive, a disc journaled in the housing between the drum and the end of the housing through which the driven shaft extends, a one-way brake interposed between said disc and the drum, to secure the drum against reverse rotation with relation to the driven shaft, means depending upon the load imposed on the driven shaft for automatically transmitting power from the drive to the driven shaft through the low gear train only, or through the low gear train and the intermediate gear train, and means also actuated by the load on the driven shaft for automatically locking both gear trains, the disc and the drum, to the drive and the driven shaft, to transmit a direct drive from the drive to the driven shaft.

11. In a transmission of the character described, a drive shaft, an intermediate shaft and a driven shaft, a reduction gear drive interposed between the drive and intermediate shaft, a pair of driving gears driven by the intermediate shaft, a driven gear meshing with both of the driving gears, a mounting for said driven gear permitting planetary movement of the driven gear about the driving gears, and also permitting rotation of the driven gear in unison with the driving gears about the axis of the intermediate shaft, said driving gears having a slight relative rotational movement with relation to each other, and means for gradually bringing about relative rotation between the driving gears to cause the teeth of said gears to gradually apply pressure to the teeth of the driven gear in opposite directions, to cause the driven gear first to planetate about the driving gears and finally to lock and revolve with said gears as a unit about their common axis, comprising a pin secured to the face of one of said driving gears, a weighted arm having one end pivoted on said pin and the opposite end arranged to swing outwardly, a lug adjacent the pivoted end of said weighted arm, a pin on the other of said driving gears projecting into said lug, a base through said drive shaft, a rod slidably disposed within said drive shaft bore, a pivotally mounted lever, a fork formed on said lever, a collar cut into said rod to receive said fork, means for linking said lever to said weighted arm, and control means for shifting said rod longitudinally within said shaft independently of rotation thereof.

THOMAS H. RYAN.